> United States Patent Office 3,151,150
Patented Sept. 29, 1964

3,151,150
PROCESS FOR THE MANUFACTURE OF ACRYLONITRILE
Jonas Kamlet, New York, N.Y.; Edna Yadven Kamlet, executrix of said Jonas Kamlet, deceased, assignor, by mesne assignments, to Edna Y. Kamlet, doing business as The Kamlet Laboratories, New York, N.Y.
No Drawing. Filed Sept. 14, 1959, Ser. No. 839,570
4 Claims. (Cl. 260—465.9)

This invention relates to a process for the manufacture of acrylonitrile. More particularly, this invention relates to a process whereby acrylonitrile may be manufactured, in good yields, from cheap and readily available industrial intermediates—acetaldehyde and hydrogen cyanide.

Acrylonitrile has become an extremely important chemical article of commerce, widely used in the manufacture of synthetic rubbers, plastics, fibers, films, plasticizers, dyestuffs, pharmaceuticals, solvents and other products.

A tremendous technology has developed and several thousand patents have issued on the manufacture of acrylonitrile by the dehydration of ethylene cyanohydrin (from HCN and ethylene oxide) and by the reaction of acetylene with HCN. Lactonitrile (which is isomeric with ethylene cyanohydrin) made by the reaction of acetaldehyde and hydrogen cyanide, cannot be dehydrated easily to form acrylonitrile and water, since it tends to decompose into the original reagents at advanced temperatures.

To obviate this tendency of lactonitrile to decompose into acetaldehyde and HCN, it has been proposed to acylate the lactonitrile and then to pyrolyze the resultant alpha-acyloxypropionic acid to obtain acrylonitrile and the organic acid. Thus, lactonitrile is reacted with acetic anhydride to form the alpha-acetoxypropionic acid, which is then pyrolyzed to form acrylonitrile and acetic acid. (Ritchie, Jones and Burns, U.S. Patent 2,183,357 (1939); Miller and Groombridge, U.S. Patent 2,452,672 (1948).) This process requires the use of an additional reagent—acetic anhydride—and the recovery and recycling of the acetic acid formed.

More recently, a process has been developed for the manufacture of acrylonitrile from acetaldehyde and hydrogen cyanide which involves reacting these compounds to form lactonitrile, mixing the lactonitrile with phosphoric acid (nitrile-acid ratio about 2:1) and then spraying this reaction mixture under pressure into a reaction chamber, where it encounters pre-heated oxygen-free combustion gases, at a temperature of about 600° C. Dehydration occurs in about 0.1 to 0.6 second. Reaction products are cooled, condensed and separated.

The phosphoric acid is recovered in this process as a solution of about 30% acid strength, which must then be concentrated to 80%–85% acid strength before it can be recycled to the process. About two-thirds of the lactonitrile is thus dehydrated to acrylonitrile, the remainder dissociating into acetaldehyde and HCN, which is recycled in the process. Part of the lactonitrile reacts with the phosphoric acid and the water present to form lactic acid and primary ammonium phosphate

—NH$_4$H$_2$PO$_4$

About 7.5 kgs. of this ammonium phosphate is obtained for every 100 kgs. of acrylonitrile formed. This salt accumulates in the recycling phosphoric acid and must be periodically separated from the system. This involves a somewhat diminished yield of acrylonitrile, complicates the phosphoric acid recovery, requires a concentration and recycle system and involves the consumption of additional phosphoric acid reagent. The overall yield of acrylontrile by this process is about 90% of theory. This process is described in U.S. Patent #2,790,822 (issued April 30, 1957, to Wolfram, Steil and Agunte) and discussed in Chemical Week (September 27, 1958), pp. 53–54, Chemical Engineering (June 1, 1957), pp. 42–44, Chemical and Engineering News (December 1, 1958), pp. 49 and 98, and by Sennewald and Steil in Chemie-Ingenieur-Technik, 30, #7, 440–446 (1958).

It is the purpose of my invention to provide a process for the manufacture of acrylonitrile from acetaldehyde and hydrogen cyanide which does not require reagents other than acetaldeyhde and HCN and does not involve by-product recovery, which does not require concentration and re-constitution of intermediates, and which gives yields in excess of 90% of theory.

The basis of my invention is the finding that acrylonitrile may be obtained in excellent yield by the steps of:
(a) reacting lactonitrile (made from acetaldehyde and hydrogen cyanide) with pre-formed acrylonitrile, in the presence of a basic catalyst, to form alpha,beta'-dicyanodiethyl ether (alpha,beta'-oxydipropionitrile):

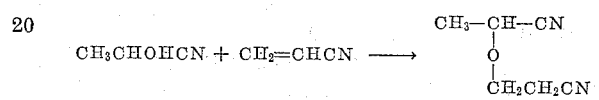

(b) pyrolyzing the alpha,beta'-dicyanodiethyl ether, at advanced temperatures, to form (for each mole of said ether) two moles of acrylonitrile and one mole of water

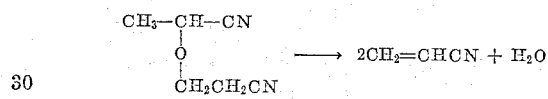

One mole of the acrylonitrile thus obtained is recycled to the first step of the process, for reaction with the lactonitrile to form the alpha,beta'-dicyanodiethyl ether. The other mole of acrylonitrile is the salable end-product of said process.

Thus, the overall effect of the process is to form acrylonitrile from acetaldehyde and hydrogen cyanide as substantially the sole reagents.

Hansley (in U.S. Patent #2,333,782 issued November 9, 1943) has shown that lactonitrile may be reacted with acrylonitrile in the presence of an alkaline catalyst, to form the alpha,beta'-dicyanodiethyl ether.

I have found that this alpha,beta'-dicyanodiethyl ether may be pyrolyzed over a very wide range of temperature, in the absence of catalysts as well as in the presence of dehydration catalysts, in the liquid phase and in the vapor phase and at subatmospheric, atmospheric and super-atmospheric pressures, to give excellent overall yields of acrylonitrile. It must be emphasized that, because of the wide range and variety of operable reaction conditions, I do not wish to be limited in the scope of this invention to any specific range of temperatures, catalyst or reaction conditions.

The lactonitrile for the process of my invention may be made by any of the well-known methods of the prior art. Thus, for instance, liquid hydrogen cyanide is adjusted to a pH between 6.0 and 8.0 with 20% aqueous soda solution. The stoichiometric amount of acetaldehyde is then added with agitation at a temperature between 10° C. and 25° C. to form lactonitrile.

The lactonitrile thus obtained may then be reacted with acrylonitrile, in the presence of an alkaline catalyst (e.g. alkali and alkaline earth metal hydroxides, alcoholates and cyanides, trialkyl amines, etc.), substantially by the process of Hansley (U.S. Patent #2,333,782) to form the desired alpha,beta'-dicyanodiethyl ether.

It is also entirely feasible to react acetaldehyde, hydrogen cyanide and acrylonitrile, in the presence of an alkaline catalyst, in a single step, to form the alpha,beta'-dicyanodiethyl ether.

The reaction of the acrylonitrile with the lactonitrile (or with acetaldehyde and HCN if the reaction is effected in a single step) is not quantitative. Thus, after the reaction of the acrylonitrile with the lactonitrile is effected, the reaction mixture is fractionated to recover the alpha,-beta'-dicyanodiethyl ether and to recover and recycle the various intermediates. Thus, the reaction product may first be fractionated at atmospheric pressure. Acetaldehyde and hydrogen cyanide (formed by the dissociation of unreacted lactonitrile) distill over first (B. Pt. acetaldehyde 21° C., hydrogen cyanide 26° C.). The unreacted acrylonitrile (B. Pt. 78.5° C.) first distills over as an azeotrope with the water present in the system. This azeotrope boils at 71° C. and contains 88% of acrylonitrile and 12% of water. The fractionation of the reaction mixture is then continued under reduced pressure, e.g. at 18–20 mm. Hg. The unreacted lactonitrile distills over at 90°–100° C. at 18–20 mm. Hg, and the alpha,beta'-dicyanodiethyl ether may be recovered at 145° to 155° C. at 18–20 mm. Hg. However, in the practical application of this process, it is only necessary to recover the acetaldehyde, hydrogen cyanide, acrylonitrile and lactonitrile fractions. The residue in the still, consisting of the alpha,-beta'-dicyanodiethyl ether, may be submitted directly to pyrolysis for the formation of acrylonitrile, without prior fractionation or purification. The recovered acetaldehyde, hydrogen cyanide, acrylonitrile and lactonitrile fractions are recycled to the process for the preparation of the alpha,beta'-dicyanodiethyl ether. The conversion of the lactonitrile and the acrylonitrile to the alpha,beta'-dicyanodiethyl ether varies from 40% to 65% per cycle, but the overall yield of the alpha,beta'-dicyanodiethyl ether, based on the actual consumption of acetaldehyde, hydrogen cyanide and acrylonitrile is 95% to 97% of theory.

The pyrolysis of the alpha,beta'-dicyanodiethyl ether to form the acrylonitrile may be effected over a very wide range of temperatures, in the absence of catalysts or in the presence of dehydration catalysts, and at subatmospheric, atmospheric or superatmospheric pressures.

In the absence of catalysts, the preferred (but by no means the only effective) temperature range for the pyrolysis of the alpha,beta'-dicyanodiethyl ether to acrylonitrile is 300° C. to 500° C.

The pyrolysis may be effected, in the absence of catalysts, by dropping the alpha,beta'-dicyanodiethyl ether in the liquid state on a heated surface, or by passing it in the vapor phase over a heated surface, or through a heated reaction zone or pyrolysis tube. The effluent gases are cooled, condensed and fractionated to recover the end products of the pyrolysis, including the acrylonitrile.

Alternately, a dehydration catalyst may be used. An extremely wide range of such catalysts may be used in the process of this invention.

Thus, the alpha,beta'-dicyanodiethyl ether may be dropped onto the surface of a heated catalyst (at 250° C. to 750° C.) and thus pyrolyzed to acrylonitrile. The catalyst may be solid or molten at the temperature of the pyrolysis. Among suitable catalysts for this purpose are: phosphoric acid, pyro-phosphoric and meta-phosphoric acid, the alkali metal and alkaline earth metal oxides, hydroxides, carbonates, and borates, the alkali metal and alkaline earth metal salts of the fatty acids, the alkali metal and ammonium salts of phosphoric acid, zinc salts, aluminum salts, aluminum oxide, and many others.

Phosphoric acid is an excellent catalyst for this purpose. At 150° C., is becomes anhydrous; at about 200° C., it reverts to pyrophosphoric acid and above 300° C. it is largely present in the form of meta-phosphoric acid.

It must be emphasized that this phosphoric acid, in any of its forms and dehydration products, acts as a true catalyst. Unlike the phosphoric acid used in the process of U.S. Patent #2,790,822 (above discussed), it is not volatilized with the reaction mixture, it is not diluted by the water of the reaction products, it does not have to be concentrated and re-constituted and it does not hydrolyze any of the starting materials or end-products to diammonium phosphate. The phosphoric acid remains in its active catalyst form and may be used as such for prolonged periods of time. The preferred (but by no means solely effective) reaction temperature for the pyrolysis employing phosphoric acid as a catalyst (or its dehydrated forms—pyrophosphoric and metaphosphoric acid) is 300° C. to 400° C.

Alternately, the alpha,beta'-dicyanodiethyl ether may be passed in the vapor state through a catalyst bed, or a heated reaction zone containing the catalyst, or through heated tubes filled with the catalyst. Catalysts suitable for this purpose are activated alumina, pumice, diatomaceous earth, fullers' earth, silica gel, Alundum, thoria, dehydrating clays, etc. as well as supported catalysts such as phosphoric acid or ammonium phosphates on any solid carrier, such as activated alumina, pumice, kaolin, clay, firebrick, silica gel, zinc chloride on any solid carrier such as the above, etc.

Alternately, the vaporized alpha,beta'-dicyanodiethyl ether may be passed, at advanced temperatures, through a turbulent bed of any of the catalysts above enumerated, in very finely divided form, by any of the technics now used in fluid bed catalyzed reactions, and well known to the art.

The preferred temperature ranges when employing such solid catalysts, with the alpha,beta'-dicyanodiethyl ether in the vapor state, is from 250° C. to 450° C., but this is by no means the solely operable or effective range. In the presence of catalysts, the pyrolysis may be effected at temperatures as high as 750° C. The use of a catalyst is not essential, but may be preferred since it usually gives a higher conversion to acrylonitrile per pass and somewhat better overall yields, as does the use of higher temperatures or temperatures within the indicated preferred range.

The products of the pyrolysis of the alpha,beta'-dicyanodiethyl ether, in each case, will consist of minor amounts of acetaldehyde (B. Pt. 21° C.), hydrogen cyanide (B. Pt. 26° C.), water (B. Pt. 100° C.) and lactonitrile (B. Pt. 90°–100° C. at 18–20 mm. Hg), and substantial amounts of the acrylonitrile (B. Pt. 78.5° C.) formed and unreacted alpha,beta'-dicyanodiethyl ether (B. Pt. 145°–155° C. at 18–20 mm. Hg). It will be noted that these products are the very same (although differing in relative amounts) as those obtained in the fractionation of the product obtained in the condensation of lactonitrile with the acrylonitrile in the preparation of the alpha,beta'-dicyanodiethyl ether (above described) which is the feed for the pyrolysis reaction.

Thus, the end-product gases of the pyrolysis step, in each case, may be cooled and condensed and then fractionated into its components. Alternately, the cooled, condensed reaction products may be mixed with the reaction products from the condensation of lactonitrile and acrylonitrile, and these combined products fractionated together. This will permit a considerable economy in equipment and processing costs.

Thus, a fraction of acetaldehyde and hydrogen cyanide may be recovered first, and recycled to the lactonitrile preparation. Then, the acrylonitrile may be recovered (first as the azeotrope with water, and then as pure acrylonitrile). Part of this acrylonitrile is recycled to the preparation of the alpha,beta'-dicyanodiethyl ether step, and the remainder represents the salable end-product of this process. Then, the unreacted lactonitrile is recovered under reduced pressure, and recycled to the process for reaction with the acrylonitrile to form the alpha,beta'-dicyanodiethyl ether. Finally, the still residue (which may be fractionated but must not necessarily be so processed) is the alpha,beta'-dicyanodiethyl ether which is the feedstock for the pyrolysis step.

The following examples are given to define and to illustrate this invention, but in no way to limit it to reagents, proportions, catalysts, or reaction conditions described therein. Obvious modifications will occur to any person skilled in the art.

Example I

Lactonitrile is prepared by adding 20% aqueous caustic soda solution to 271 grams of liquid hydrogen cyanide (10 moles) to adjust its reaction to pH 7.0. A total of 443 gms. of acetaldehyde (10 moles) is now added slowly, with good agitation, keeping the temperature of the reaction mixture between 10° C. and 25° C. In another vessel, 531 grams of acrylonitrile (10 moles) and 5 grams of potassium cyanide (as a catalyst) are heated under gentle reflux, while the lactonitrile above formed is added slowly over a period of an hour. The reaction mixture is kept at 85°–90° C. for another hour, and is then cooled, and adjusted to pH 7 by the addition of 20% sulfuric acid. The product is then fractionated (as described in the specification) first at atmospheric pressure, then at 18–20 mm. Hg pressure to recover acetaldehyde, hydrogen cyanide, acrylonitrile, lactonitrile and the alpha, beta'- dicyanodiethyl ether. The conversion to alpha, beta'-dicyanodiethyl ether varies from 40% to 65% per cycle, but the overall yield, based on the actual consumption of acetaldehyde, hydrogen cyanide and acrylonitrile is 95% to 97% of theory.

The alpha,beta'-dicyanodiethyl ether is pyrolyzed by adding it dropwise, at the rate of about 200 gms. per hour, from a dropping funnel, into a 500 cc. flask, the bottom of which is heated at 350° to 375° C. The gaseous pyrolysis products are conducted off, cooled, condensed and fractionated.

Alternately, the alpha,beta'-dicyanodiethyl ether may be pyrolyzed by vaporizing it under reduced pressure (e.g. at 180°–200° C. under 20 mm. Hg. pressure), and this is passed through a quartz tube (0.50" inside diameter, 15" long) at the rate of 75 gms. per hour, the tube being maintained by electric heating elements at a temperature of 375° to 400° C. The gaseous pyrolysis products are conducted off, cooled, condensed and fractionated.

The conversion of alpha,beta'-dicyanodiethyl ether to acrylonitrile is from 32% to 70% per pass, and the overall yield, based on the alpha,beta'-dicyanodiethyl ether actually consumed, is 93% to 96% of theory.

Example II

Fifty grams of phosphoric acid is placed in a reaction flask and heated to 350°–360° C. (which converts it largely to meta-phosphoric acid). The alpha,beta'-dicyanodiethyl ether (prepared as described in Example I) is added dropwise onto the surface of the acid from a dropping funnel, at the rate of 50 gms. per hour. The reaction products of the pyrolysis are conducted off, cooled condensed and fractionated.

The conversion to acrylonitrile is from 62% to 80% per cycle, with overall yields of 94% to 95% based on the alpha,beta'-dicyanodiethyl ether consumed. Similar results are obtainable by the use of alkali metal and alkaline earth metal oxides, hydroxides, carbonates and borates, the alkali metal and alkaline earth metal salts of the fatty acids, the alkali metal and ammonium salts of phosphoric acid, zinc salts, aluminum salts, aluminum oxide, and many other dehydration catalysts.

Example III

Alpha,beta'-dicyanodiethyl ether is vaporized under reduced pressure (e.g. at 250°–275° C. at 25–30 mm.) and this is passed through a quartz tube (0.50" inside diameter, 15" long) half filled with activated alumina granules as a catalyst, maintained at a temperature of 300°–325° C., at the rate of 90 gms. per hour. The gaseous pyrolysis products are conducted off, cooled, condensed and fractionated.

The conversion to acrylonitrile is 50%–55% per pass, with an overall yield of 95% of theory, based on the alpha,beta'-dicyanodiethyl ether actually consumed.

Similar results are obtained by the use of catalysts such as pumice, diatomaceous earth, fullers' earth, silica gel, Alundum, thorium dioxide, dehydrating clays, supported catalysts such as phosphoric acid or ammonium phosphate on solid carriers such as alumina, pumice, kaolin, clay, firebrick, silica gel, zinc chloride, aluminum chloride, etc.

Having described my invention, what I claim and desire to protect by Letters Patent is:

1. The cyclic process for the manufacture of acrylonitrile which comprises the steps of:
   (a) reacting lactonitrile with acrylonitrile in the presence of a basic catalyst to form alpha,beta'-dicyanodiethyl ether,
   (b) separating the alpha,beta'-dicyanodiethyl ether from unreacted lactonitrile and acrylonitrile,
   (c) pyrolyzing the alpha,beta'-dicyanodiethyl ether to form two moles of acrylonitrile and one mole of water for each mole of dicyanodiethyl ether consumed, said pyrolysis being effected at a temperature between 250° C. and 750° C. and at a pressure at which the acrylonitrile formed is vaporized,
   (d) recovering acrylonitrile and unreacted dicyanodiethyl ether from the pyrolysis products of step c,
   (e) recycling to step c the unreacted alpha,beta'-dicyanodiethyl ether recovered from step d,
   (f) recycling to step a the unreacted acrylonitrile and lactonitrile from step b together with a portion of acrylonitrile from step d equal to the amount of acrylonitrile which had been consumed in step a and
   (g) recovering as product from step d an amount of acrylonitrile stoichiometrically equivalent to at least 90% of the lactonitrile consumed in the process.

2. The process as defined in claim 1 wherein the pyrolysis is effected at a temperature of 300° C. to 500° C.

3. The process as defined in claim 1 wherein the pyrolysis is effected in the presence of a dehydration catalyst.

4. The process as defined in claim 3 wherein the pyrolysis is effected at a temperature of 250° C. to 450° C.

References Cited in the file of this patent

UNITED STATES PATENTS

| | | |
|---|---|---|
| 2,333,782 | Hansley | Nov. 9, 1943 |
| 2,562,583 | Schulz et al. | July 31, 1951 |
| 2,832,798 | Rapoport | Apr. 29, 1958 |

OTHER REFERENCES

Institute of Synthetic Organic Chemical Research C.A., 44 (1950), page 3515(B).